Jan. 20, 1942.  H. C. OSBORN, JR  2,270,333
PRESSURE RELIEF VALVE
Filed Aug. 2, 1940  2 Sheets-Sheet 1

INVENTOR.
BY HENRY C. OSBORN JR.
Bates Teare & McBean
ATTORNEYS

Jan. 20, 1942.   H. C. OSBORN, JR   2,270,333
PRESSURE RELIEF VALVE
Filed Aug. 2, 1940   2 Sheets-Sheet 2

INVENTOR.
HENRY C. OSBORN JR.
BY Bates Teare & McBean
ATTORNEYS

Patented Jan. 20, 1942

2,270,333

UNITED STATES PATENT OFFICE

2,270,333

PRESSURE RELIEF VALVE

Henry C. Osborn, Jr., Cleveland Heights, Ohio, assignor to Glascote Products, Inc., Euclid, Ohio, a corporation of Ohio Application August 2, 1940, Serial No. 349,468

14 Claims. (Cl. 137—53)

This invention relates to an improved pressure relief valve and particularly to a relief valve which will act to relieve both excess and deficient pressures. This, therefore is the general object of the present invention. A more specific object of this invention is to provide a pressure relief valve which may be maintained in a highly sanitary condition to permit its use on containers such as are used for foodstuffs, as for instance, milk tanks and the like.

Another object of this invention is to provide an improved pressure relief valve which will comprise a relatively small number of parts, easily separable, one from the other, and individually cleansed.

A further object of the present invention is to provide a pressure relief valve using an imperforate flexible member to relieve pressures below or above predetermined limits, and which will be so constructed as to facilitate separation of the parts for replacement or cleansing and permit subsequent reassembly of the parts without changing the responsiveness of the valve to such predetermined minimum and maximum pressures.

A further object of this invention is to provide a pressure relief valve having an imperforate pressure responsive valve member arranged to relieve both over and under pressure conditions and which valve member having relieved one type of pressure condition, will continue to function normally, but which after relieving the other type of pressure condition, will remain in an open or relieving position until reset by an attendant.

A more specific object of the present invention is to provide a simple and efficient relief valve or vent device which may be economically manufactured and assembled.

Other objects and advantages of the present invention will become more apparent from the following description which relates to a preferred embodiment of the invention illustrated in the accompanying drawings. The essential features of the invention will be summarized in the claims.

Figure 1:
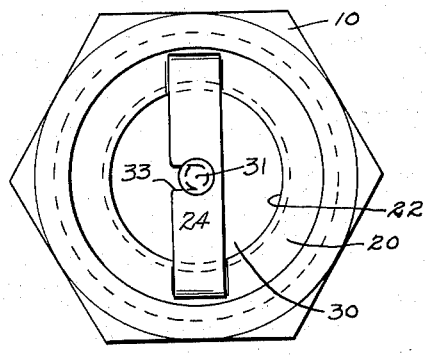
Figures 2, 4:
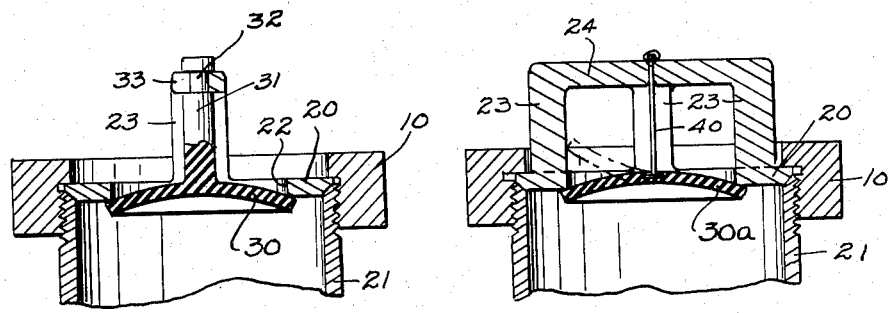
Figure 3:
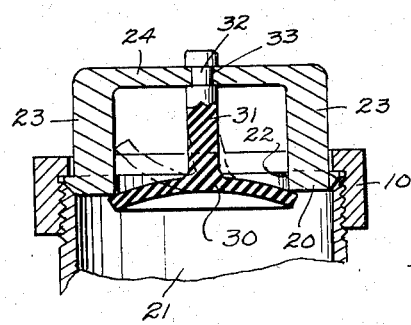
Figure 5:
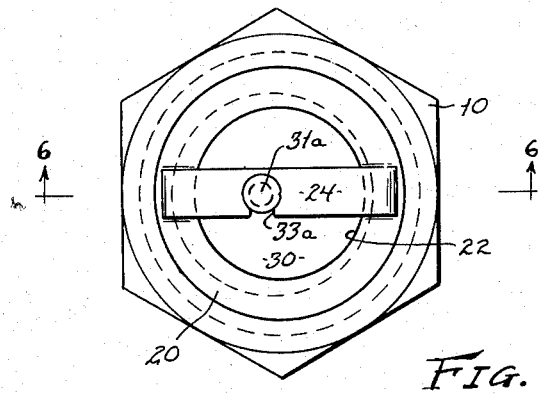
Figure 6:
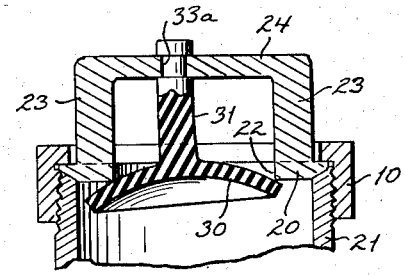
Figure 7:
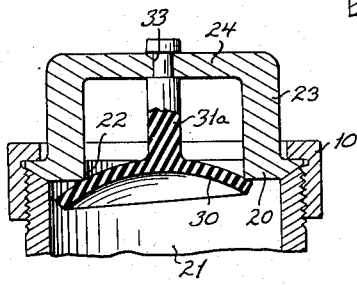
Figure 8:
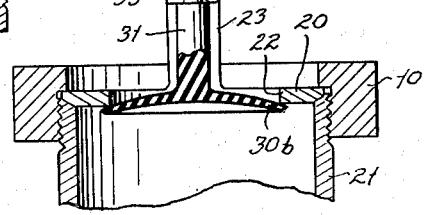

Referring now to the drawings, wherein I illustrate a preferred form of the invention, Fig. 1 is a plan view of my improved pressure relief valve assembly; Fig. 2 is a vertically extending axial section; Fig. 3 is a sectional view illustrating certain of the parts in a different position; and Fig. 4 is a plan view of a section similar to Fig. 2, but illustrating a modified form of valve member, Fig. 5 is a plan view similar to Fig. 1 but illustrating a modified form of my invention; Fig. 6 is a vertically extending section as indicated by the lines 6—6 of Fig. 5; and Figs. 7 and 8 are sections similar to 3 and 6 illustrating modified forms of valve members.

Another feature of the present invention is the use of an imperforate disc as a valve member together with a flexible, resilient support for the valve member as well as specific features which aid in predetermining the limits of pressure to which the valve is responsive.

Referring now in detail to the accompanying drawings, it will be seen that my improved pressure relief valve comprises a valve assembly which is adapted to be removably mounted on a vent of a tank or container by a suitable means, as for instance, by a union nut 10.

My improved valve assembly comprises a ring 20 which seats against the end of a vent tube or pipe 21 and is secured thereto by the union nut 10 as shown in Fig. 2. The central opening 22 of the ring provides the valve port. A pair of upstanding arms 23 connected at their tips by a bridge-like formation 24 are secured to the ring 20. To facilitate the cleaning of the assembly, the ring and bridge are preferably formed as a unitary structure.

The valve member comprises an imperforate flexible resilient disc 30, preferably formed of a rubber composition or of a substance having generally similar physical characteristics. The valve disc 30 is slightly larger in diameter than the diameter of the valve port 22, and is provided with a substantially axially positioned flexible stem 31. This stem has a reduced portion 32 arranged to be positioned in a slot 33 formed in the bridge 24. When the stem is so positioned, the upper surface of the valve disc bears against the lower surface of the ring 20.

The length of the stem is such that it will tension the valve disc and cause it to assume a dished or convex position whereby the resiliency of the valve disc causes it to engage the surface of the ring 20 with a predetermined pressure, thus closing the valve port 22.

In the modification shown in Fig. 4, the valve disc 30a comprises an imperforate flexible resilient disc and is supported in contact with the ring 20 by a flexible wire, cord, or chain 40. One end of this cord is preferably molded in the valve disc and the other end arranged to be passed through a suitable opening in the bridge 24 and be secured in position by any suitable method, preferably one which will facilitate removal and replacement of the valve disc. In the modification, the ring 20 is provided with four posts 23 to insure retention of the valve disc in the open or dotted line position when opened by an excess pressure in the container.

When the pressure in the tank or receptacle to which the valve is attached falls below a predetermined amount, the periphery of the flexible valve disc 30 or 30a is forced downward by the atmospheric pressure external of the tank, thereby opening the valve port and retaining it open until the pressure in the tank is increased to the predetermined minimum. Adjustment of the minimum pressure may be accomplished by controlling the resiliency and thickness of the valve member and/or by the length of the valve stem 31 or cord 40, any one of which controls the pressure of the valve member against the disc 20.

When the pressure in the tank increases above a predetermined maximum, it forces the valve member through the valve port 22 in the disc 20, somewhat as indicated in dotted lines in Figs. 3 and 4, whereupon the pressure within the tank is brought to atmospheric pressure, and the valve remains in a blown or open position until reset. The frictional engagement between the periphery of the valve member and inner wall of one of the upstanding arms 23 of the valve assembly insures the retention of the valve member 30 or 30a in an open position.

In some instances, the valve and valve stem cannot be readily constructed to give both the desired minimum and maximum pressure requirements. In some instances, a construction is followed which will provide the desired minimum pressure requirement, and the maximum pressure requirement is secured by controlling the diameter of the valve disc and either offsetting the opening 33 in the bridge 24 from the true center as indicated at 33a in Figs. 5 and 6, or offsetting the stem 31 or cord 40 from the true center of the valve member as indicated at 31a in Fig. 7. When the pressure builds up in the tank, the edge of the valve member, which is closest to the opening 31 will have shorter distance to move than other portions of the valve member before it clears the valve port opening, thus increasing the tendency of that area of the valve member to slide or be blown through the valve port opening as the pressure in the tank increases.

As illustrated, my improved relief valve assembly is arranged to automatically reseat after relieving a deficient tank pressure, and to remain unseated after relieving an excess tank pressure. It is obvious that I may reverse these conditions by inverting the assembly relative to the vent opening.

An advantageous manner of determining the responsive pressure of the valve is to provide a valve member which is thicker at the center than at its edges as shown in Fig. 8. For instance, the thickness of the valve member may start to decrease midway between the center and the edge so that at the periphery 30a the valve member will be less than its thickness over the central area, for instance, a decrease of fifty percent.

From the foregoing construction, it will be seen that my improved relief valve comprises but two members which may be secured to a tank by a clamping nut, easily removed and separated for cleansing, readily reassembled without disturbing the pressure responsiveness of the valve, and by a substitution of a relatively inexpensive part, the responsive pressure may be changed as desired. The valve member being imperforate is more readily cleansed and control of its physical characteristics is materially enhanced. While I have described the valve assembly as being secured to a container by the usual union nut, it is obvious that any desired securing means may be used.

I claim:

1. In a pressure relief valve, a disc having a valve port opening therein, an arm supported by said disc and projecting inwardly above said valve port, a resilient flexible valve member engaging the bottom surface of the disc to close the opening therein, and a flexible stem interconnected between the valve member and said arm to retain the valve member in contact with the disc to thereby close said valve opening, said stem being arranged and adapted to permit an excess of pressure on the bottom surface of the valve member to force the valve member through the valve port and thereby open said valve.

2. In a pressure relief valve, a disc having an enlarged central opening and an arm supported by said disc and projecting upwardly and inwardly therefrom to a point above the opening in said disc, a resilient flexible valve disc having a diameter greater than the diameter of the opening in said first named disc, a flexible valve stem carried by said valve disc and detachably secured to said arm to retain the valve disc seated against the under surface of the first named disc with a predetermined pressure, said stem and valve disc being of such flexibility as to normally maintain the valve closed and to permit a portion of said valve disc to be forced through the valve port consequent upon an excess of pressure below the valve disc and wherein said valve disc is of such diameter as to remain in an open position with a portion thereof extending through said valve port until manually reset.

3. In a pressure relief valve, a disc having a valve port opening extending therethrough, and an arm projecting upwardly and inwardly to a point above said valve port opening, a flexible valve stem depending from said arm toward the valve port opening, a flexible resilient valve member carried by said arm and having a substantially flat surface when in unflexed condition adapted and arranged to engage the bottom surface of the disc and thereby close the valve port opening, said flexible valve stem being of such length as to normally retain said valve member in a convex position, and wherein the resiliency of said member causes it to form a pressure seal with the valve stem and the lower surface of the disc, the valve port opening and the valve member being of such relative diameters as to permit an excess of pressure to force a portion of the valve through the valve port opening to permanently open the valve.

4. In a pressure relief valve, a disc having a valve port opening, a valve supporting arm carried by the disc and extending upwardly therefrom to a position axially above the valve opening, an imperforate resilient valve disc having its upper surface in contact with the lower surface of said ported disc, and a flexible member secured to said resilient disc and connected to said arm and of such length as to retain the resilient disc in convex position, and said valve disc being arranged and adapted to open said valve port consequent upon either a predetermined increase or decrease in pressure.

5. In a pressure relief valve, a disc having a valve opening, a flexible valve stem extending axially of the valve port opening, means carried by the disc to removably support the valve stem, an imperforate resilient valve disc carried by said stem and engaging one surface on the first named disc to close the opening therein and positioned non-axially relative to said valve opening, said stem being formed integrally with said valve disc and of such length as to draw the valve disc partially into said valve port and place the predetermined tension on said valve disc.

6. In a pressure relief valve, a disc having an enlarged circular valve opening, a flexible valve stem carried by said disc and extending eccentrically toward the opening therein, a resilient flexible valve disc concentrically secured to said valve stem, said valve disc having a diameter greater than the diameter of the opening in said first named disc, and said stem being of such length as to tension the valve disc against the first named disc.

7. A pressure relief valve, a disc having an enlarged circular valve port therein and an arm extending thereabove, a flexible valve stem extending coaxial relative to the valve port in the disc, one end of said stem being removably supported by said arm, an imperforate resilient flexible valve member axially secured to the other end of said stem, said member being of a greater diameter than the diameter of the valve port, said stem being so interconnected between said arm and said valve member as to permit movement of the valve member in a direction away from that side of the disc against which it is normally positioned and to permit bodily movement of said valve member in the opposite direction, whereby an excess pressure on said valve member may force said member through said valve port, thereby opening said port, and means to retain said valve member in a position to retain said port open.

8. In a pressure relief valve comprising a valve member having a valve port opening, an imperforate pressure responsive member to close said opening, said member being arranged and adapted to open said port consequent upon either a predetermined increased or decreased pressure condition and to reseat itself following the release of one type of pressure condition and to remain unseated following the relief of the other type of pressure condition.

9. A pressure relief valve comprising a valve body having a valve port opening, a resilient valve member, means acting on said valve member to tension it, whereby the resiliency of the valve member causes it to close the valve port by contact with the body and so arranged as to permit a deficient pressure to draw the valve member out of contact with said body, means to support said valve member to permit an excess pressure to force said valve member through the valve port, thus opening said port, and wherein said valve member comprises a sheet of resilient material the thickness of which decreases from the center toward the periphery thereof.

10. In a pressure relief valve comprising a valve member having a valve port opening, a pressure responsive member to close said opening, said pressure responsive member being arranged and adapted to open said port consequent upon either a predetermined increased or decreased pressure condition and to reseat itself following the release of one type of pressure condition and to remain unseated following the relief of the other type of pressure condition.

11. In a pressure relief valve, a valve body having a valve port opening, a pressure responsive member adapted to normally close said port and adapted and arranged to open said valve port consequent upon either a predetermined maximum pressure or a predetermined minimum pressure to thereby relieve an over or under pressure condition, said valve member being arranged and adapted to reseat itself consequent upon the relief of pressure under a predetermined minimum pressure, and means to retain said valve member unseated following the relief of a pressure above the predetermined maximum pressure.

12. In a pressure relief valve, a body having an enlarged valve port opening, a valve stem carried by said body and extending axially toward said opening, a resilient flexible valve disc eccentrically secured to said valve stem, said valve disc having a diameter greater than the diameter of the valve port opening, said stem being of such length as to tension the valve disc against the valve body to normally close the valve port opening.

13. In a pressure relief valve, a disc having a valve port opening therein, a valve stem extending axially through the opening in the disc, means carried by the disc to support the valve stem, a resilient flexible valve member carried by said stem, and engaging one surface on the disc to close the valve port opening therein, means on the stem to retain the valve member thereon and in contact with the disc to thereby close said valve port opening, and wherein said valve member is of such size relative to said valve port opening as to permit a portion of said member to be forced through said opening by fluid pressure to open said valve or to permit fluid pressure in the opposite direction to open said valve by moving said valve member away from said valve port opening.

14. In a pressure relief valve, a disc having a valve opening, a valve stem extending axially toward the valve opening, means carried by the disc to support the valve stem, a resilient flexible valve disc carried by said stem and engaging one surface on the first named disc to close the opening therein, and wherein said valve disc is positioned eccentrically relative to said valve opening.

HENRY C. OSBORN, Jr.